United States Patent [19]

Kageyama et al.

[11] Patent Number: 5,176,444
[45] Date of Patent: Jan. 5, 1993

[54] VEHICLE BRAKING FORCE CONTROL SYSTEM

[75] Inventors: Fumio Kageyama; Haruki Okazaki; Toru Onaka; Toshiaki Tsuyama, all of Hiroshima, Japan

[73] Assignee: Mazda Motor Corporation, Hiroshima, Japan

[21] Appl. No.: 711,862

[22] Filed: Jun. 7, 1991

[30] Foreign Application Priority Data

Jun. 8, 1990 [JP] Japan .................. 2-151097

[51] Int. Cl.[5] ................... B60T 8/32; B60T 8/70
[52] U.S. Cl. .................... 303/102; 303/100; 303/104; 303/105
[58] Field of Search ............. 303/102, 103, 105, 106, 303/107, 108, 104, 111, 119 R, 119 SV, 118, 61; 180/197; 364/426.02, 426.03; 188/181 A, 181 C

[56] References Cited

U.S. PATENT DOCUMENTS

| | | | |
|---|---|---|---|
| 3,550,966 | 12/1970 | Leiber | 303/119 R |
| 3,727,992 | 4/1973 | Bowler et al. | 303/107 |
| 3,888,550 | 6/1975 | Reinecke et al. | 303/103 |
| 4,033,634 | 7/1977 | Arai et al. | 303/103 |
| 4,575,160 | 3/1986 | Leiber et al. | 303/119 SV X |
| 4,585,280 | 4/1986 | Leiber | 303/105 X |
| 4,779,696 | 10/1988 | Harada et al. | 303/103 X |
| 4,881,784 | 11/1989 | Leppek | 303/105 X |

FOREIGN PATENT DOCUMENTS

| | | | |
|---|---|---|---|
| 2517349 | 10/1976 | Fed. Rep. of Germany | 303/105 |
| 2717383 | 11/1978 | Fed. Rep. of Germany | 303/105 |
| 3326959 | 2/1985 | Fed. Rep. of Germany | 303/105 |
| 6341332 | 12/1979 | Japan | |

OTHER PUBLICATIONS

Bosch Technische Berichte, English special edition (Feb. 1982), ISSN 0006-789X, pp. 78-82, Technical and Scientific Report I.

Primary Examiner—Douglas C. Butler
Attorney, Agent, or Firm—Sixbey, Friedman, Leedom & Ferguson

[57] ABSTRACT

A braking force control system controls the brake fluid pressure applied to the wheel during braking when each of the wheels of the vehicle tends to lock so that the slip ratio of the wheel converges on a target slip ratio. The brake fluid pressure is once fixed at the beginning of the braking force control, and when the slip ratio falls below the target slip ratio by fixing the brake fluid pressure, the brake fluid pressure is increased at a first rate, and when the slip ratio does not increase to a predetermined slip ratio in a predetermined time after the slip ratio falls below the target slip ratio or when the rate of increase of the slip ratio after the slip ratio falls below the target slip ratio is lower than a predetermined rate, the brake fluid pressure is increased at a second rate which is higher than the first rate.

6 Claims, 5 Drawing Sheets

VEHICLE BRAKING FORCE CONTROL SYSTEM

BACKGROUND OF THE INVENTION

1. Field of the Invention

This invention relates to a braking force control system for a vehicle which prevents the wheels from locking and skidding during braking.

2. Description of the Prior Art

As disclosed, for instance, in Japanese Patent Publication No. 63(1988)-41332, there has been known an antilock control system in which the braking force acting on each wheel is controlled so that the slip ratio of the wheel converges on a target slip ratio (normally a slip ratio at which the friction coefficient between the wheel and the road surface is maximized).

In such an antilock control system, when tendency of the wheel to lock during braking, the brake fluid pressure is once fixed to the value at that time, and when the tendency is further enhanced and the slip ratio of the wheel exceeds the target slip ratio, the brake fluid pressure begins to be reduced while when the slip ratio is reduced below the target slip ratio by fixing the brake fluid pressure, the brake fluid pressure begins to be increased.

FIG. 5 shows manners of change in the slip ratio after the slip ratio once begins to reduce by fixing the brake fluid pressure. In FIG. 5, the target slip ratio has a certain width between upper and lower limits. Assuming that the slip ratio increases by application of the brakes and it is determined that a wheel tends to lock and the brake fluid pressure is fixed at time t1, the slip ratio will not fall below the lower limit of the target slip ratio and will remain in the target slip ratio range as shown by line A so long as the friction coefficient μ of the road surface is small. On the other hand, when the friction coefficient μ of the road surface is not small, the slip ratio continues to fall and becomes smaller than the lower limit of the target slip ratio range at time t2. In the latter case, the brake fluid pressure begins to be increased at the time t2 at a predetermined rate to return the slip ratio to the target slip ratio range, and as a result, sometimes the slip ratio does not fall greatly and returns to the target slip ratio range in a short time as shown by line B or falls greatly and takes a long time to return to the target slip ratio range as shown by line C (shortage in rise of slip ratio).

When the friction coefficient μ of the road surface is large, the slip ratio sometimes changes along the line C. That is, when the slip ratio temporarily increases during braking on a large μ road (road having a large friction coefficient μ), for instance, due to snow which remains on a part of the road, it is determined that the wheel tends to lock and the brake fluid pressure is fixed. In such a case, the friction coefficient μ of the road surface soon returns to being large and accordingly the slip ratio begins to fall greatly and does not return to the target slip ratio range in a short time even if the brake fluid pressure is increased at the predetermined rate from that time. When such a shortage in the rise of the slip ratio occurs, the deceleration of the vehicle body lowers markedly and the vehicle may skid on some road surfaces. Accordingly, in such a case, it is preferred that teh brake fluid pressure be increased at a higher rate after the slip ratio falls below the lower limit of the target slip ratio range in order to quickly increase the slip ratio.

However if the rate at which the brake fluid pressure is increased after the slip ratio falls below the lower limit of the target slip ratio range is increased indiscriminately, there arises another problem, though the above problem can be overcome, that, in the case where the slip ratio changes as shown by the line B, the slip ratio quickly increases and can exceed the upper limit of the target slip ratio range by a large amount even if the brake fluid pressure is fixed at the time the slip ratio exceeds the lower limit of the target slip ratio range.

SUMMARY OF THE INVENTION

In view of the foregoing observations and description, the primary object of the present invention is to provide a braking force control system which can overcome the former problem without giving rise to the latter problem.

In accordance with a first aspect of the present invention, the braking force is once fixed at the beginning of the braking force control, and when the slip ratio falls below the target slip ratio by fixing the braking force, the braking force is increased at a first rate, and when the slip ratio does not increase to a predetermined slip ratio in a predetermined time after the slip ratio falls below the target slip ratio, the braking force is increased at a second rate which is higher than the first rate.

In accordance with a second aspect of the present invention, the braking force is once fixed at the beginning of the braking force control, and when the slip ratio falls below the target slip ratio by fixing the braking force, the braking force is increased at a first rate, and when the rate of increase of the slip ratio after the slip ratio falls below the target slip ratio is lower than a predetermined rate, the braking force is increased at a second rate which is higher than the first rate.

The target slip ratio may be defined either as a certain value or as a certain range having an upper limit and a lower limit. In the latter case, that the slip ratio falls below the target slip ratio means that the slip ratio falls below the lower limit of the target slip ratio range. Said predetermined slip ratio may be equal to the the target slip ratio, and if desired, it may be lower or higher than the target slip ratio.

When the slip ratio changes along the line C in FIG. 5, the slip ratio takes a longer time to return to the target slip ratio than when it changes along the line B. Accordingly, by suitably selecting the predetermined time, whether the slip ratio is changing along the line B or the line C can be determined, and by increasing the rate of increase of the braking force (e.g., the brake fluid pressure) when the slip ratio does not increase to a predetermined slip ratio in the predetermined time after the slip ratio falls below the target slip ratio, the above object of the present invention can be accomplished.

Further, since the rate of increase of the slip ratio is less increased for a given increase of the braking force when the slip ratio is changing along the line C than when it is changing along the line B, the above object of the present invention can be accomplished by suitably selecting said predetermined rate and by increasing the rate of increase of the braking force when the rate of increase of the slip ratio is not higher than the predetermined rate.

DESCRIPTION OF THE PREFERRED EMBODIMENT

Figure 1:
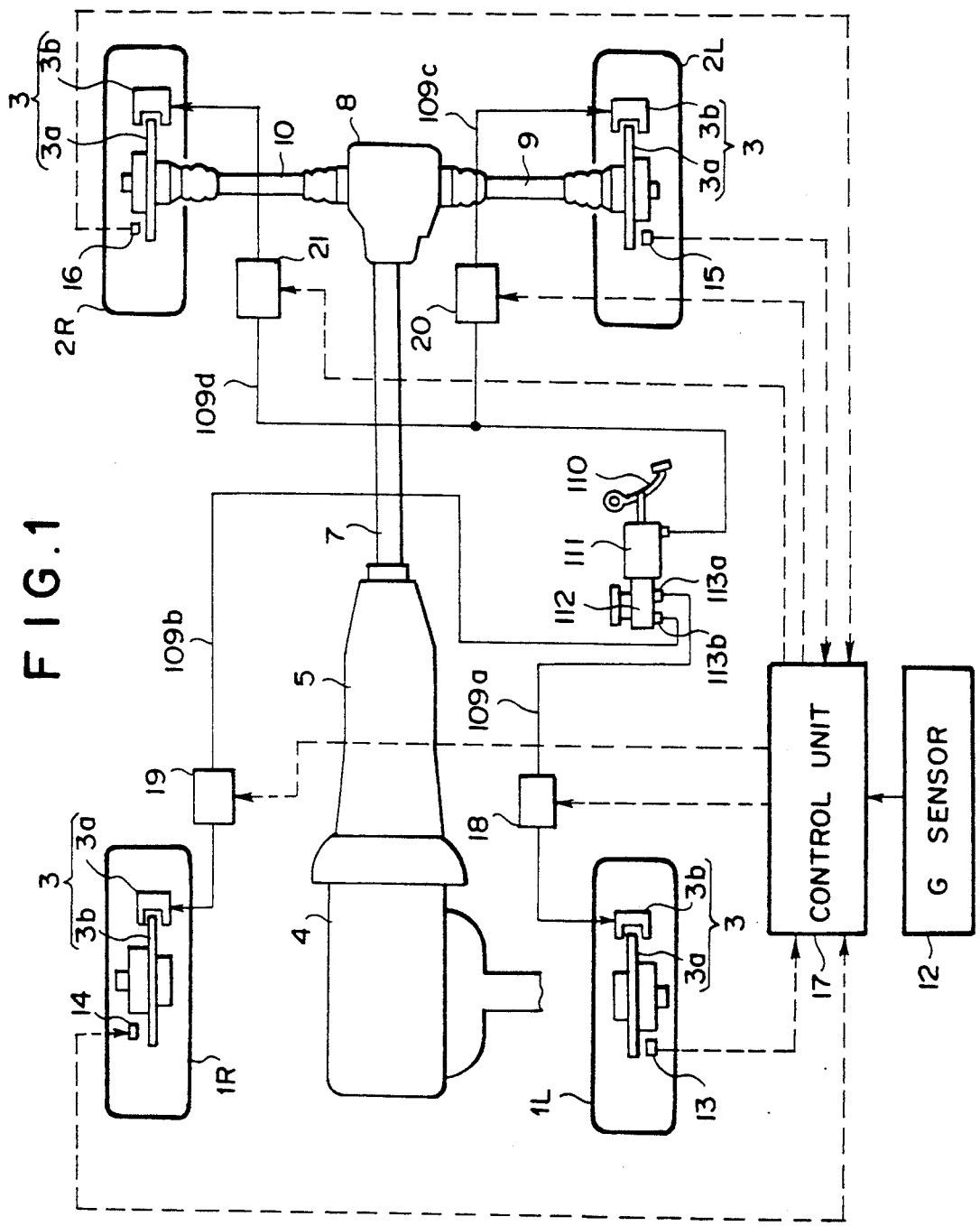
FIG. 1 is a schematic view showing a vehicle provided with a braking force control system in accordance with an embodiment of the present invention.

In FIG. 1, a vehicle has an engine 4, and the output torque of the engine 4 is transmitted to left and right rear wheels 2L and 2R by way of an automatic transmission 5, a propeller shaft 7, a differential 8, and left and right drive shafts 9 and 10. Reference numerals 1L and 1R respectively denote left and right front wheels.

The wheels 1L, 1R, 2L and 2R are provided with brakes 3 each comprising a disk rotor 3a and a caliper 3b, and brake fluid pressure is applied to the respective calipers 3b respectively through brake lines 109a to 109d.

A brake pedal 110 is connected to a tandem master cylinder 112 by way of a power brake booster 111. Brake fluid pressure produced by the master cylinder 112 is transmitted to the caliper 3b of the left front wheel 1L by way of the brake line 109a which is connected to a first discharge port 113a of the master cylinder 112 and to the caliper 3b of the right front wheel brake 1R by way of the brake line 109b which is connected to a second discharge port 113b of the master cylinder 112.

The calipers 3b of the left and right wheels 2L and 2R are connected to the power brake booster 111 by way of brake lines 109c and 109d. The brake lines 109a to 109d are respectively provided with brake fluid pressure control valves 18 to 21 which controls the brake fluid pressures applied to the brakes 3 under the control of a control unit 17.

Signals from an acceleration sensor 12 which detects the deceleration of the vehicle body and wheel speed sensors 13 to 16 which detect the rotational speeds of the left and right front wheels 1L and 1R and the left and right rear wheels 2L and 2R (wheel speeds) are input into the control unit 17.

In the antilock brake control, the control unit 17 calculates the slip ratios of the respective wheels 1L, 1R, 2L and 2R on the basis of the signals from the acceleration sensor 12 and the wheel speed sensors 13 to 16, and output control signals to the brake fluid pressure control valves 18 to 21 to cause them to control the brake fluid pressure applied to the brakes 3 so that the slip ratio of each wheel converges on a target slip ratio at which the most efficient braking takes place.

Figure 2:
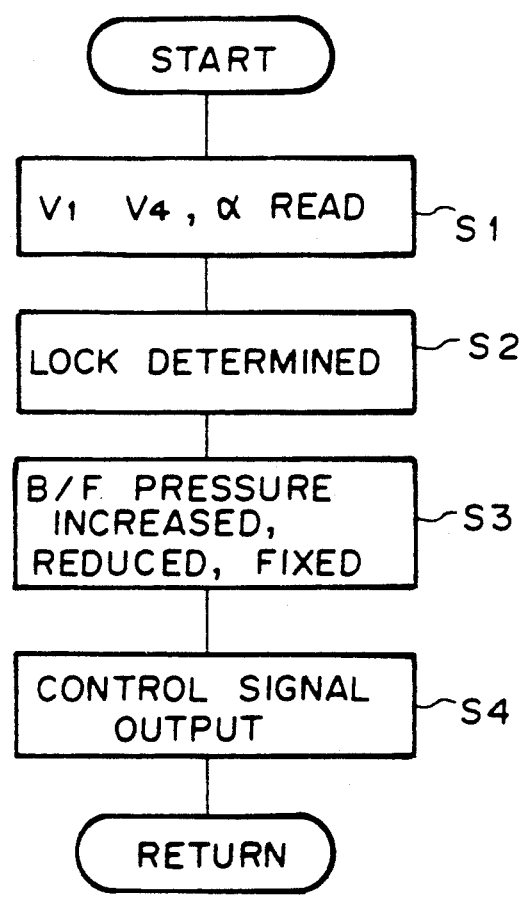
FIG. 2 is a flow chart for illustrating the basic control of a braking force control system in accordance with an embodiment of the present invention.

FIG. 2 shows a flow of the basic control which the control unit 17 executes.

The control unit 17 first reads the wheel speeds V1 to V4 of the wheels 11, 1R, 2L and 2R on the basis of the signals from the wheel speed sensors 13 to 16 and the deceleration $\alpha$ of the vehicle body on the basis of the signal from the acceleration sensor 12. (steps S1) Then the control unit 17 determines in step S2 whether each wheel tends to lock. This determination may be made in various ways. For example, the control unit 17 may determine that the wheel tends to lock when the deceleration of the wheel speed exceeds a predetermined value or when the slip ratio of the wheel exceeds a target slip ratio range.

Thereafter, the control unit 17 determines in step S3 whether the brake fluid pressure is to be increased, reduced or fixed. Here the brake fluid pressure control is not performed when it is determined that the wheel does not tend to lock in step S2, and is performed to converge the slip ratio on the target slip ratio range only when it is determined that the wheel tends to lock in step S2.

In step S4, the control unit 17 outputs control signals to the brake fluid pressure control valves 18 to 21 according to the result of the determination in step S3.

The control unit 17 calculates the slip ratios S1 to S4 of the respective wheels according to the following formula.

$$S = [(VREF - V)/VREF] \times 100(\%) \qquad (1)$$

wherein S represents the slip ratio of each wheel (S1 to S4), VREF represents a pseudo-vehicle-speed and V represents the wheel speed (V1 to V4). The pseudo-vehicle-speed VREF is calculated according to the following formula.

$$VREF = MXVW - \int \alpha dt \qquad (2)$$

wherein MXVW represents the highest one of the wheel speeds V1 to V4.

The slip ratio S need not be calculated according formula (1) but may be calculated according to various other formulae so long as it substantially represents the slip of the wheel. For example, the slip ratio S may be a value obtained by simply subtracting the wheel speed from the pseudo-vehicle-speed or by simply dividing the wheel speed by the pseudo-vehicle-speed. Further, the pseudo-vehicle-speed need not be calculated according to formula (2) but may be calculated by various other manner.

The control at the beginning of the antilock brake control will be described in detail, hereinbelow.

As soon as the control unit 17 determines that the wheel tends to lock in step S2, the control unit 17 fixes the brake fluid pressure. With the brake fluid pressure fixed, the control unit 17 detects the change in the slip ratio, and when the slip ratio further increases and exceeds the upper limit of the target slip ratio range, the control unit 17 reduces the brake fluid pressure, and, on the other hand, when the slip ratio falls below the lower limit of the target slip ratio range, the control unit 17 increases the brake fluid pressure at a rate which is determined in the following manner.

In this particular embodiment, the control unit 17 first increases the brake fluid pressure at a first rate and then at a second rate which is higher than the first rate when the slip ratio does not increase to the target slip ratio range a predetermined time after the slip ratio falls below the lower limit of the target slip ratio range.

Figure 3:
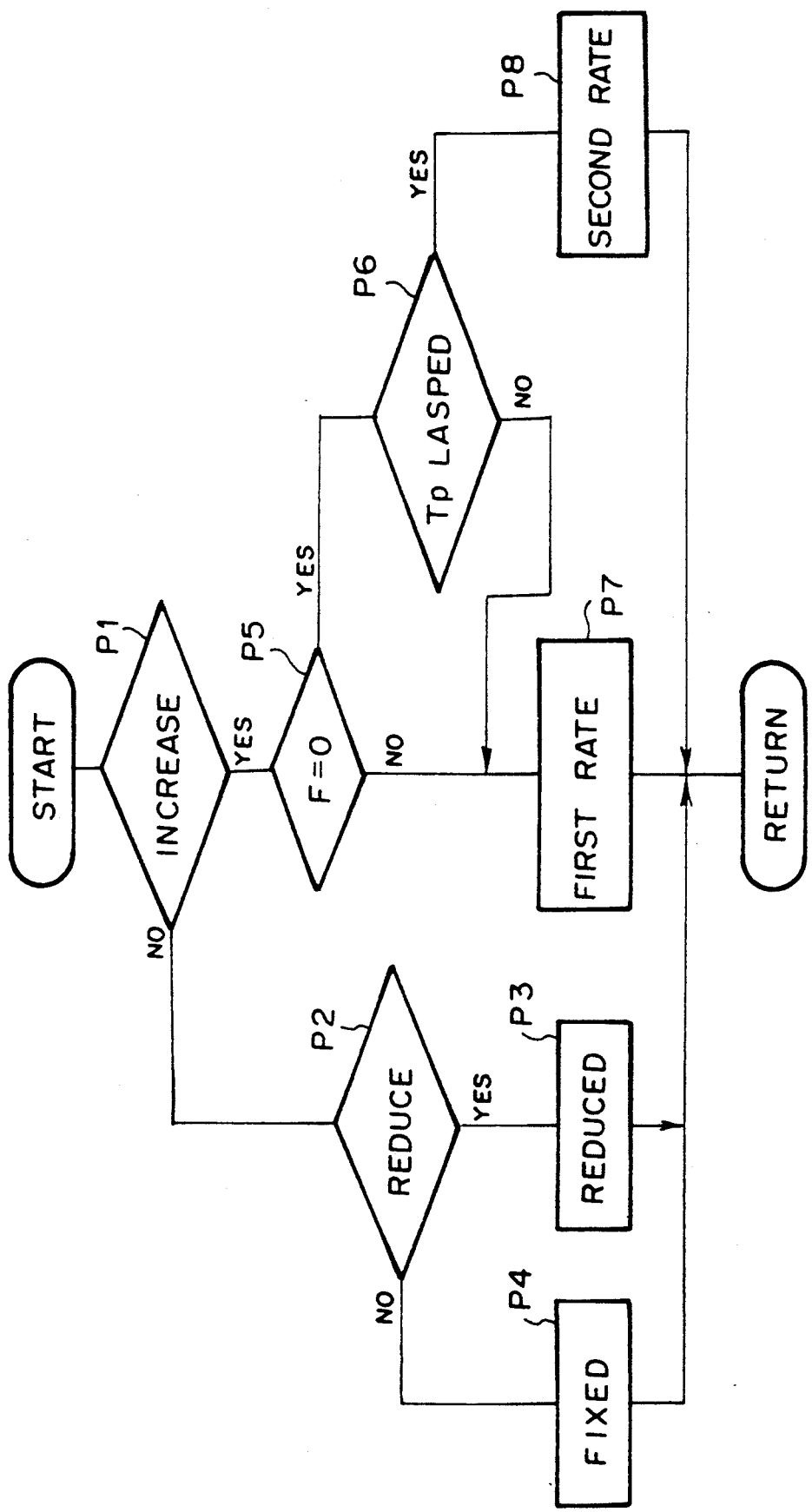
FIG. 3 is a flow chart for illustrating an example of the manner in which the control unit controls the brake fluid pressure.

That is, in FIG. 3, the control unit 17 determines whether it has determined that the brake fluid pressure is to be increased. (step P1) When the answer to the question in step P1 is "no", the control unit 17 further determines in step P2 whether the brake fluid pressure is to be reduced. When the answer to the question step P2 is "no", that is when the brake fluid pressure is to be fixed, the control unit 17 outputs a brake fluid pressure fixing signal (as the control signal) to the brake fluid pressure control valves 18 to 21 which causes the brake fluid pressure control valves 18 to 21 to fix the brake fluid pressure. (step P4) When the answer to the question step P2 is "yes", that is, when the brake fluid pressure is to be reduced, the control unit 17 outputs a brake fluid pressure reducing signal (as the control signal) to the brake fluid pressure control valves 18 to 21 which causes the brake fluid pressure control valves 18 to 21 to reduce the brake fluid pressure. (step P3)

When it is determined in step P1 that the control unit 17 has determined that the brake fluid pressure is to be increased, that is, when the slip ratio falls below the lower limit of the target slip ratio range (at the time t2 in FIG. 5), the control unit 17 first determines in step P5 whether a continuation flag F is 0. The continuation flag F is set to 0 while the slip ratio is below the lower limit of the target slip ratio range with the brake fluid pressure fixed, and set to 1 when the slip ratio recovers near the lower limit of the target slip ratio range, e.g., to a predetermined value lower than the lower limit by a predetermined amount, after once falling below the lower limit. When it is determined in step P5 that the flag F is 0, the control unit 17 determines in step P6 whether a predetermined time Tp lapses after the time t2 at which the slip ratio fell below the lower limit of the target slip ratio range. When the answer to this question is "no", the control unit 17 outputs a first brake fluid pressure increasing signal (as the control signal) to the brake fluid pressure control valves 18 to 21 which causes the brake fluid pressure control valves 18 to 21 to increase the brake fluid pressure at the first rate which is determined according to the condition of the road surface. On the other hand, when the answer to the question in step P6 is "yes", that is, when the slip ratio does not recover to the predetermined value in the predetermined time, the control unit 17 outputs a second brake fluid pressure increasing signal (as the control signal) to the brake fluid pressure control valves 18 to 21 which causes the brake fluid pressure control valves 18 to 21 to increase the brake fluid pressure at the second rate which is higher than the first rate. (step P8) Even if the control unit 17 has determined that the brake fluid pressure is to be increased, the control unit 17 outputs the first brake fluid pressure increasing signal so long as the flag F is 1. When the first rate varies according to the condition of the road surface, the second rate should be higher than the highest value of the first rate.

Figure 5:
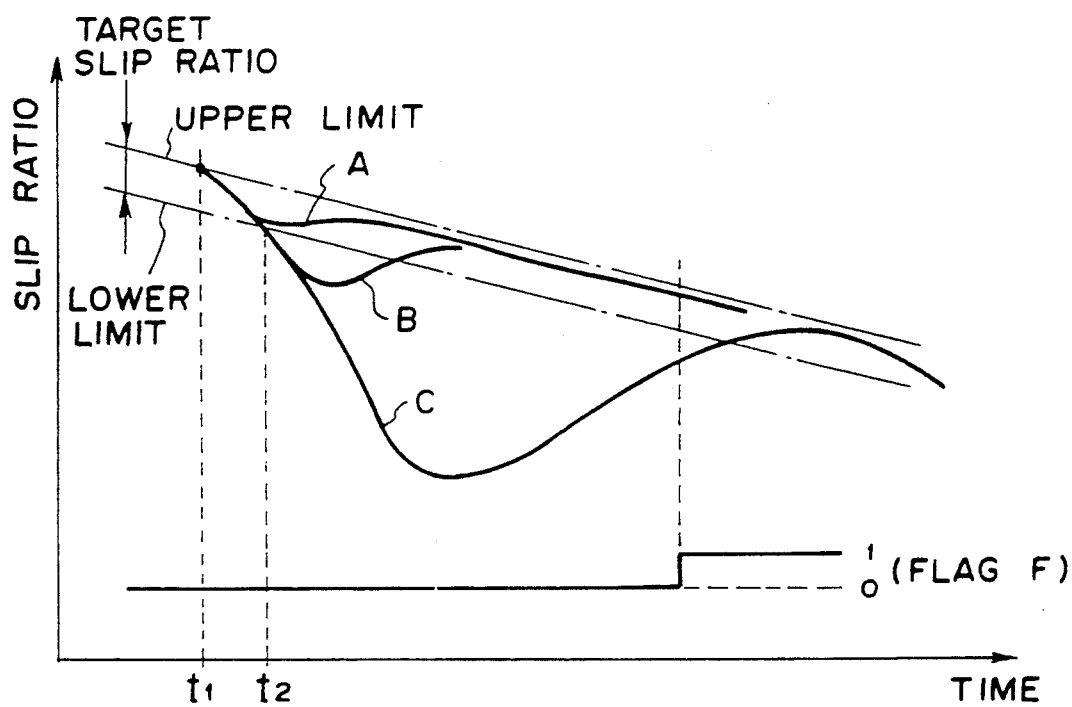
FIG. 5 is a view showing manners of change in the slip ratio after the slip ratio once begins to reduce by fixing the brake fluid pressure.

The predetermined time is empirically determined so that the slip ratio can recover substantially to the target slip ratio range in the predetermined time when the slip ratio changes in the manner shown by the line B in FIG. 5 and cannot recover substantially to the target slip ratio range in the predetermined time when the slip ratio changes in the manner shown by the line C.

Figure 4:
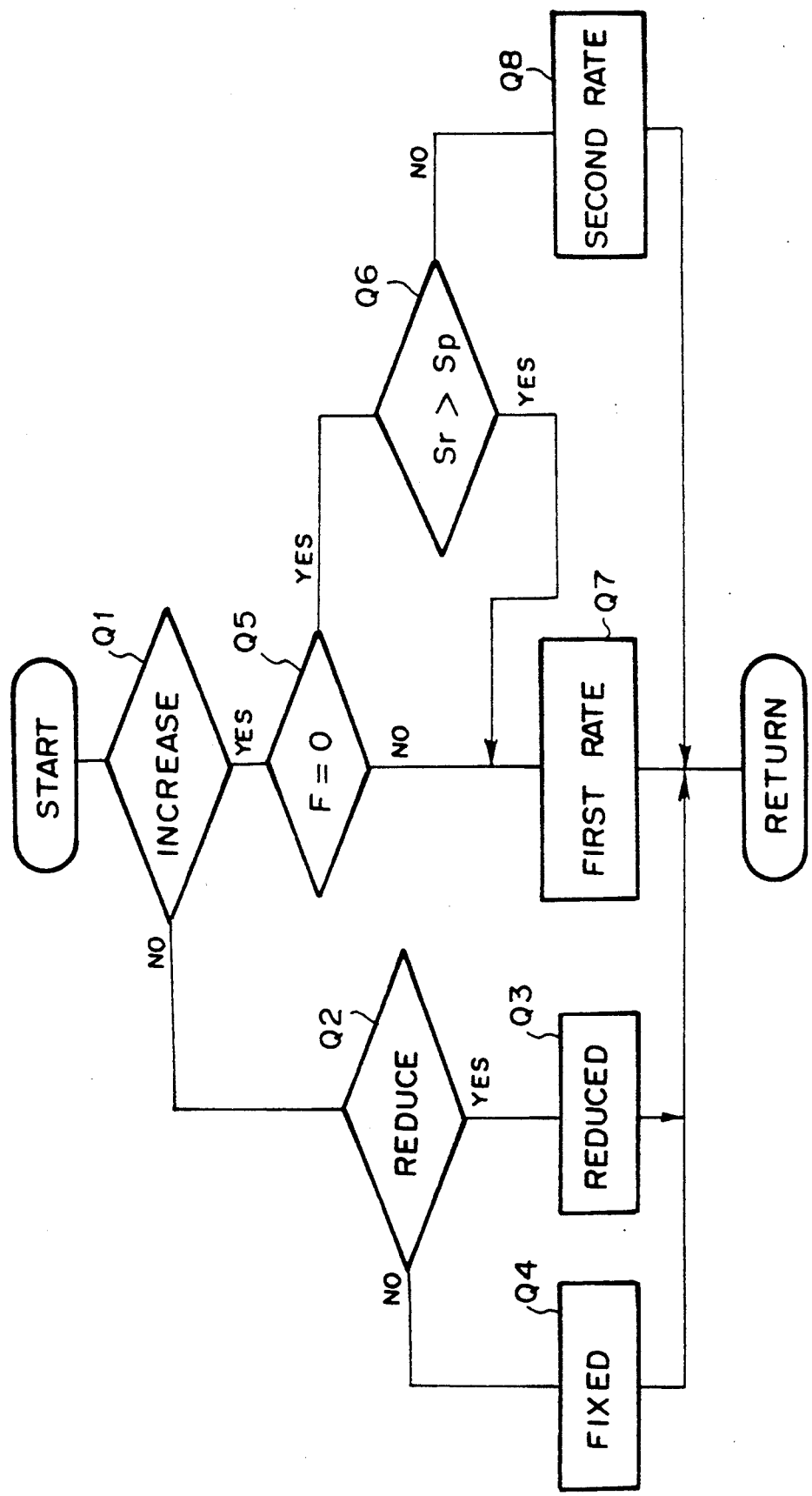
FIG. 4 is a flow chart for illustrating another example of the manner in which the control unit controls the brake fluid pressure.

The control unit 17 may switch the rate of increase of the brake fluid pressure to the second rate according to the rate of increase of the slip ratio as shown in FIG. 4. That is, when the control unit 17 has determined that the brake fluid pressure is to be increased, the continuation flag F is 0 and the rate of increase Sr of the slip ratio is lower than a predetermined rate Sp, the control unit 17 outputs the second brake fluid pressure increasing signal. (steps Q1, Q5, Q6 and Q8) When the rate of increase of the slip ratio is not lower than the predetermined rate, the control unit 17 outputs the first brake fluid pressure increasing signal. (step Q7) In this specification, the term "rate of increase of the slip ratio" should be broadly interpreted to include the rate of reduction of the slip ratio. More particularly, when the slip ratio reduces, it should be considered that the rate of increase becomes higher as the rate of reduction reduces.

If the rate of increase of the brake fluid pressure is increased or set to the second rate when the rate of increase of the slip ratio is not lower than a certain rate, the slip ratio will increase excessively high even if the brake fluid pressure is fixed at the time the slip ratio returns to the target slip ratio range. Said predetermined rate may be set to such a "certain rate".

We claim:

1. A braking force control system for a vehicle comprising a slip ratio detecting means for detecting an actual slip ratio of each wheel of the vehicle, a lock detecting means for detecting that a respective wheel tends to lock and a braking force changing means which changes a braking force applied to each wheel during braking when the lock detecting means detects that the respective wheel tends to lock so that the actual slip ratio of the respective wheel converges on a target slip ratio, wherein said braking force changing means fixes the braking force at a predetermined value when the lock detecting means detects that the respective wheel tends to lock, increases the braking force at a first rate when the actual slip ratio falls below the target slip ratio as a result of fixing the braking force, and increases the braking force at a second rate which is higher than the first rate when the actual slip ratio does not increase to a predetermined slip ratio within a predetermined time after the actual slip ratio falls below the target slip ratio.

2. A braking force control system as defined in claim 1 in which said target slip ratio is defined as a range having upper and lower limits, and said braking force changing means increases the braking force at the first rate when the actual slip ratio falls below the lower limit of the target slip ratio range.

3. A braking force control system as defined in claim 2 in which said predetermined slip ratio is lower than the lower limit of the target slip ratio range by a predetermined amount.

4. A braking force control system as defined in claim 2 in which said predetermined slip ratio is equal to the lower limit of the target slip ratio range.

5. A braking force control system for a vehicle comprising a slip ratio detecting means for detecting an actual slip ratio of each wheel of the vehicle, a lock detecting means for detecting that a respective wheel tends to lock and a braking force changing means which changes the braking force applied to the respective wheel during braking when the lock detecting means detects that the respective wheel tends to lock so that the actual slip ratio of the respective wheel converges on a target slip ratio, wherein said braking force changing means fixes the braking force at a predetermined value when the lock detecting means detects that the respective wheel tends to lock, increases the braking force at a first rate when the actual slip ratio falls below the target slip ratio as a result of fixing the braking force, and increases the braking force at a second rate which is higher than the first rate when the rate of increase of the actual slip ratio after the actual slip ratio falls below the target slip ratio is lower than a predetermined rate.

6. A braking force control system as defined in claim 5 in which said target slip ratio is defined as a range having upper and lower limits, and said braking force changing means increases the braking force at the first rate when the actual slip ratio falls below the lower limit of the target slip ratio range.

* * * * *